United States Patent
Knipfer et al.

(10) Patent No.: US 7,840,452 B2
(45) Date of Patent: Nov. 23, 2010

(54) APPLICATION, METHOD AND PROCESS FOR MANAGING PART EXCHANGEABILITY ACROSS FUNCTIONAL BOUNDARIES

(75) Inventors: Ivory Wellman Knipfer, Rochester, MN (US); Fraser Allan Syme, Rochester, MN (US); Matthew H. Zemke, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 919 days.

(21) Appl. No.: 11/468,448

(22) Filed: Aug. 30, 2006

(65) Prior Publication Data
US 2008/0056228 A1 Mar. 6, 2008

(51) Int. Cl.
*G06Q 10/00* (2006.01)
(52) U.S. Cl. .................. 705/28; 705/29
(58) Field of Classification Search .......... 705/28
See application file for complete search history.

(56) References Cited

U.S. PATENT DOCUMENTS

| | | | |
|---|---|---|---|
| 5,796,614 A * | 8/1998 | Yamada | 700/106 |
| 5,971,585 A * | 10/1999 | Dangat et al. | 700/102 |
| 6,073,378 A * | 6/2000 | Gabbert | 40/661 |
| 7,072,730 B2 * | 7/2006 | Kobayashi et al. | 700/100 |
| 2001/0014836 A1 | 8/2001 | Tamaki et al. | |
| 2002/0095348 A1 * | 7/2002 | Hiroshige et al. | 705/26 |
| 2002/0143667 A1 * | 10/2002 | Ho | 705/28 |
| 2003/0115115 A1 * | 6/2003 | Ouchi | 705/27 |
| 2005/0090921 A1 * | 4/2005 | Denton et al. | 700/100 |
| 2007/0159197 A1 * | 7/2007 | Brueckner et al. | 324/761 |

* cited by examiner

*Primary Examiner*—F. Ryan Zeender
*Assistant Examiner*—Fateh M Obaid
(74) *Attorney, Agent, or Firm*—Yee & Associates, P.C.; Steven L. Bennett

(57) ABSTRACT

A computer implemented method, computer program product, and data processing system for managing proxy parts that are exchangeable based on an active exchangeable proxy part list, a production history, and a true demand. A production history is used to compile a list of active exchangeable proxy parts. The most available active exchangeable proxy part is chosen as a proxy part in a unit. The target part in the unit's production order is overridden with the newly assigned proxy part number. Following the implementation of the proxy part, the proxy part is recovered. The proxy part is returned to production inventory, where it may be reassigned as a proxy part or implemented as a production part.

15 Claims, 4 Drawing Sheets

| ACTIVE PARTS 402 THAT MAY BE EXCHANGED FOR DASD | | ON-HAND INVENTORY | TRUE CUSTOMER DEMAND | |
|---|---|---|---|---|
| PART# | SIZE | STOCK | DEMAND | |
| AAP3810 | 36.4 GB | 0 | 0 | DEMAND > SUPPLY |
| AAP3830 | 36.4 GB | 0 | 0 | |
| AAP5258 | 36.4 GB | 100 | 120 | |
| BBP3832 | 73.4 GB | 80 | 0 | DEMAND = SUPPLY |
| BBP5260 | 73.4 GB | 70 | 150 | |
| CCP3834 | 146.0 GB | 0 | 90 | DEMAND > SUPPLY |
| CCP3909 | 146.0 GB | 100 | 350 | |
| DDP3155 | 300.0 GB | 150 | 75 | DEMAND < SUPPLY |
| | | | | |

APPLICATION, METHOD AND PROCESS FOR MANAGING PART EXCHANGEABILITY ACROSS FUNCTIONAL BOUNDARIES

BACKGROUND OF THE INVENTION

1. Field of the Invention

The present invention relates generally to inventory control in a manufacturing environment. More specifically, this invention relates to the management of parts that are used to make a unit functional, but are not included with the shipped production order.

2. Description of the Related Art

In many production environments, it is common to have interchangeable or "alternate" parts. When one of a group of alternate parts is required by a production order, any of the group may be used to satisfy the production demand. For example, three versions of 2 GB memory cards may exist in inventory, all three are functionally equivalent, and so any of the three are allowed to fulfill demand for any one of the three. The use of alternate parts is also extendable to "proxy" part demand. Proxy parts are used to temporarily make a nonfunctional unit or production order into a functional unit, such that process steps requiring the order to be functional, such as test, can be completed. Before the production order is shipped, proxy parts are removed and returned to inventory to be reused or sold as seen fit.

Upon creation or release of a new product, some basic features are identified as legitimate for a customer not to order. For example, a computer will not function properly without memory. However, some customers would like to buy the computer without memory since they can obtain memory from a separate source. When such a production order is received, a configuration system identifies the need for some proxy feature. In this example, memory must temporarily be added so the computer can function, and therefore can be tested or have software loaded and configured. The proxy feature is defined in a bill of material, which contains at least one proxy part. Just as with non-proxy parts, any available alternate part may be used to fulfill demand for this proxy part. Once the proxy part has fulfilled its purpose, it is removed from the unit.

BRIEF SUMMARY OF THE INVENTION

The illustrative embodiments provide a computer-implemented method, computer program product and data processing system for managing proxy parts that are exchangeable. A production history is used to compile a list of active exchangeable proxy parts. The most available active exchangeable proxy part is chosen as a proxy part in a unit. The unit's production order is overridden with the proxy part number. Following the implementation of the proxy part, the proxy part is recovered. The proxy part is returned to production inventory, where it may be reassigned as a proxy part or implemented as a production part.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
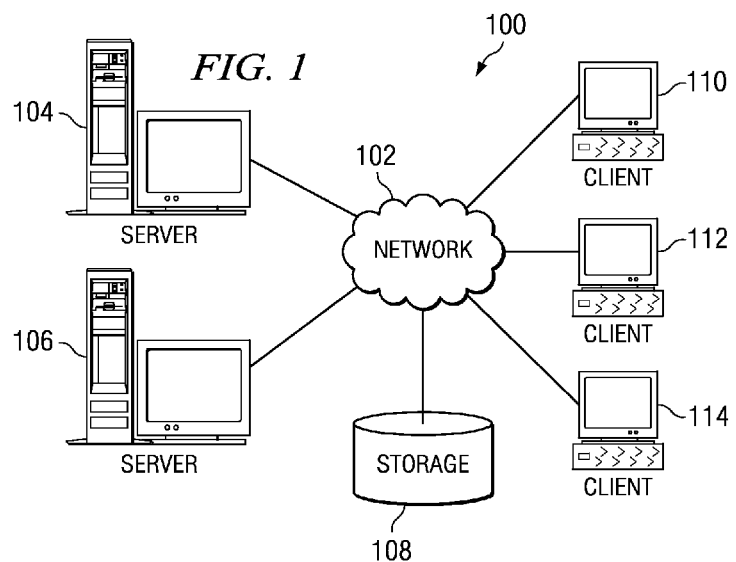
FIG. 1 depicts a pictorial representation of a network of data processing systems in which the illustrative embodiments may be implemented.
Figure 2:
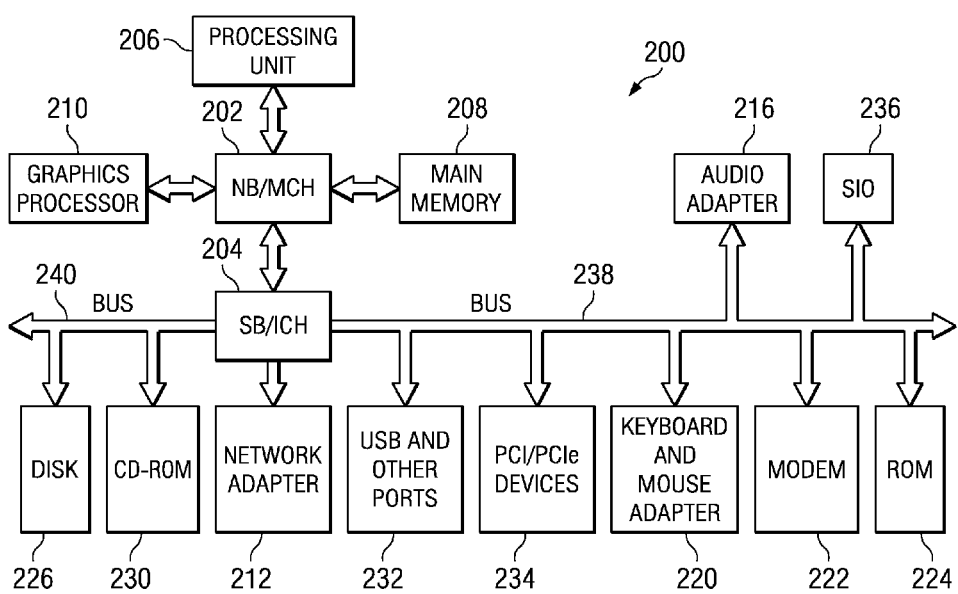
FIG. 2, a block diagram of a data processing system, is shown in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide an improved manufacturing system by calculating a best-fit proxy part that maximizes use of available inventory for shipping production orders. A new class of part is coined "exchangeable." This new classification relates to those parts that have a common purpose, but are not necessarily functionally equivalent. For example, proxy part demand for a 2 GB memory card may be satisfied by any 2, 4, or 8 GB memory card, since the part will ultimately be removed from the production order. So, these parts are identified as exchangeable.

An exchangeable part method is executed to manage a proxy part in its implementation in a proxy part flow. However, once removed from the unit after test, the proxy part may be put back in production inventory and reused later as either a proxy part or a production part. The improved manufacturing system has practical advantages. First, the exchangeable classified parts may be eventually sold. Second, as these proxy parts, classified as exchangeable, are maintained in the production inventory system, and as there is no separate inventory system, the likelihood of having an inventory of stale parts is reduced. Stale parts are parts that are no longer used in production units. The manufacturing system automatically identifies the most appropriate part to use, based on the initial set up of the part, the quantity of parts in stock, and the demand for the part. The system will shorten manufacturing cycle times, especially in peak demand periods. It will reduce risk of miss-shipment due to constraint of proxy parts. It will maximize available inventory by using the concept of production inventory exchangeability for proxy parts. Moreover, the exchangeable part method may minimize capital expenditures typically used to support captive proxy parts.

A problem with existing proxy part methods is that the quantity of the proxy parts available depends solely on production demand for the same part. If production part demand is low for a specific part, then there is low flexibility to build orders that require proxy parts. Essentially, there is a proxy part shortage, so production is delayed while waiting for a proxy part that will not be shipped with the unit regardless. The alternative is to buy excess production parts in order to increase ability to build orders requiring proxy parts. The result is stale inventory; part numbers that are no longer used in production units.

The improved manufacturing system in the illustrative embodiments solves these problems using an exchangeable part method to manage a proxy part in the unit. A proxy part is a production part that is used as a proxy part temporarily. The proxy part is placed back in production inventory following its use as a proxy. Utilizing the exchangeable logic for proxy parts adds flexibility in the material flow. For a requested proxy part, part numbers, which share the same exchangeable classification, may be available for use as the assigned proxy part. In accordance with the illustrative embodiments, the most available proxy part number is assigned as a proxy part. The most available proxy part is the part that has least demand and the most parts in inventory. Therefore, the assigned exchangeable proxy part ideally is the most available proxy part number.

An assigned exchangeable proxy part may or may not be functionally the same part, but it must be a functionally similar part. For example, a 36-gigabyte (GB) drive is similar enough to a 72-gigabyte (GB) drive to make a unit functional for test. The 36 GB drive and 72 GB drive are given the same exchangeability classification. In this example, the exchangeability classification assigned is Direct Access Storage Device (DASD). Other example exchangeability classifications in an electronics manufacturing facility are memory and processor parts.

On the other hand, an alternative part is a permanent replacement for its alternate. An alternate part, unlike an exchangeable classified part, must be functionally the same.

Figures 3, 4:
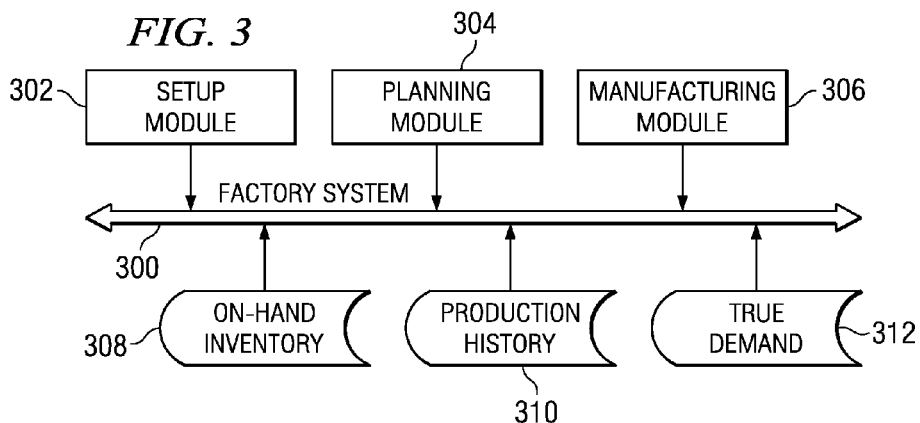
FIG. 3 depicts a block diagram of several factory data processing system components, contained in an over-all factory data processing system, in accordance with the illustrative embodiments.
FIG. 4 is a representation of an exchangeable part table for calculating the most available proxy part that is exchangeable, in accordance with the illustrative embodiments.

FIG. 3 depicts a block diagram of several factory data processing system components contained in an over-all factory data processing system, in accordance with the illustrative embodiments. Factory data processing system 300 is represented by an arrow and may contain more modules and data storage than depicted in the figure. Setup module 302, planning module 304, and manufacturing module 306 represent the systems used by engineering, planning, and manufacturing personnel, respectively. On-hand inventory 308, production history 310, and true demand table 312 represent data available to the factory system. Setup module 302 may be a set of user interface templates that may be used by engineering to define new part numbers, units, and specifications. New exchangeability classifications for parts are set up as needed. Engineering defines parts that are exchangeable for proxy parts. Engineering may assign an exchangeability classification attribute to the parts for use in unit setup.

Classifications of parts may be made by grouping functionally similar parts together and inputting these groupings into a template. Thus, if new parts were defined in the future, they may be added to the exchangeable classification template and may then be available as proxy parts without the need to update. Planning module 304 is used by planning personnel to start and track unit production in the factory. Manufacturing module 306 is used by manufacturing personnel to manage the workflow in the factory. Specifications and part numbers are listed in manufacturing module 306.

On-hand inventory 308 is data contained in a database that indicates the inventory that is currently available for production. Production history 310 is data that indicates the activity level and status of units and shipments in the factory. True demand table 312 indicates the production demand for each part number.

FIG. 4 is a representation of an exchangeable part table for calculating the most available proxy part that is exchangeable, in accordance with the illustrative embodiments. Table 400 illustrates the search for the most available proxy part for a production unit using the exchangeable classification. The parts are grouped by size 401. Different part numbers can be of the same size. In this example, the like size indicates that the parts are alternate parts. An alternate part may replace the original part in a unit and be sold. Unlike a proxy part, an alternate part is a permanent substitution for the original part number. Therefore, any true demand of a part with the same size may be satisfied by another part of the same size.

The production order bill of material requires a proxy Direct Access Storage Device (DASD) part to test a unit. DASD 402 is the exchangeability classification type shown. In table 400, all the parts listed are classified as DASD exchangeable. First column 403 lists active exchangeable proxy parts that may be exchanged for a DASD proxy part. Second column 401 lists the sizes of the parts. Third column 415 lists the number of parts in on-hand inventory. On-hand inventory consists of production inventory that is located in-house. On-hand inventory is often called stock or in stock inventory. Fourth column 416 lists the true demand of the part. True demand is the total demand for the parts. True demand does not include proxy part usage. Fifth column 417 lists the supply and demand difference for the parts and the part alternatives.

The first size category is 36.4 GB. Three part numbers AAP3810, AAP3830, and AAP5258 are alternate 36.4 GB part numbers. This means that any one of the three part numbers may replace the other two part numbers.

The first active part number listed as an exchangeable candidate for the DASD proxy is AAP3810 410. There are no AAP3810 parts in on-hand inventory 415. The true demand for the part is also 0 416. Part number AAP3830 412 also has a size of 36.4 GB, 0 parts are in on-hand inventory and there is 0 demand indicated for the part. Next, part number AAP5258 414 shows an on-hand inventory of 100 parts 415 and a true demand number of 120 parts 416.

The combined demand for the alternate part numbers of 36.4 GB is greater than the combined on-hand inventory for the alternate part numbers. The difference is calculated by subtracting the total alternative part true demand number from the total alternative part on-hand inventory number. In this example the difference between the on-hand inventory of 100 parts and the true demand of 120 parts is equal to −20 417, making AAP3810, AAP3830 and AAP5258 poor candidates for proxy.

The next size category is 73.4 GB. BBP3832 418 has 80 parts in on-hand inventory 415 and 0 true demand 416 for the part. BBP5260 419, which also has a size of 73.4 GB is an alternative part to BBP3832. Since BBP3832 and BBP5260 have the same size, in this example they are alternate parts. BBP5260 419 has 70 parts in on-hand inventory 415 and a true demand of 150 parts 416. The on-hand inventory numbers for each part are combined. The true demand numbers of each part are combined. The difference is then taken between the two numbers. Thus, the number of parts on-hand for size 73.4 GB parts is 150 415 and the true demand for size 73.4 GB parts is 150 416. On-hand inventory (stock) equals true demand, the difference in supply and true demand is 0 417. Thus, parts BBP3832 and BBP5260 are not good candidates for proxy.

The next size category is 146 GB. Part CCP3834 420 has 0 parts in on-hand inventory and a true demand of 90 parts 416, while part CCP3909 421 has 100 parts in on-hand inventory 415 and a true demand of 350 parts 416. The supply and demand difference for these alternative parts is −440 417; this is the difference between 0+100 parts in on-hand inventory 415 and the 90+350 parts true demand 416. Parts CCP3834, and CCP3909 are not good proxy candidates.

The last size category is 300 GB, line 422. The only part DDP3155 in the category has 150 parts in on-hand inventory 415 and 75 in true demand 416. The difference between the true demand and on-hand inventory is +75. Thus, DDP3155 is the best candidate part to be used as a proxy.

Figure 5:
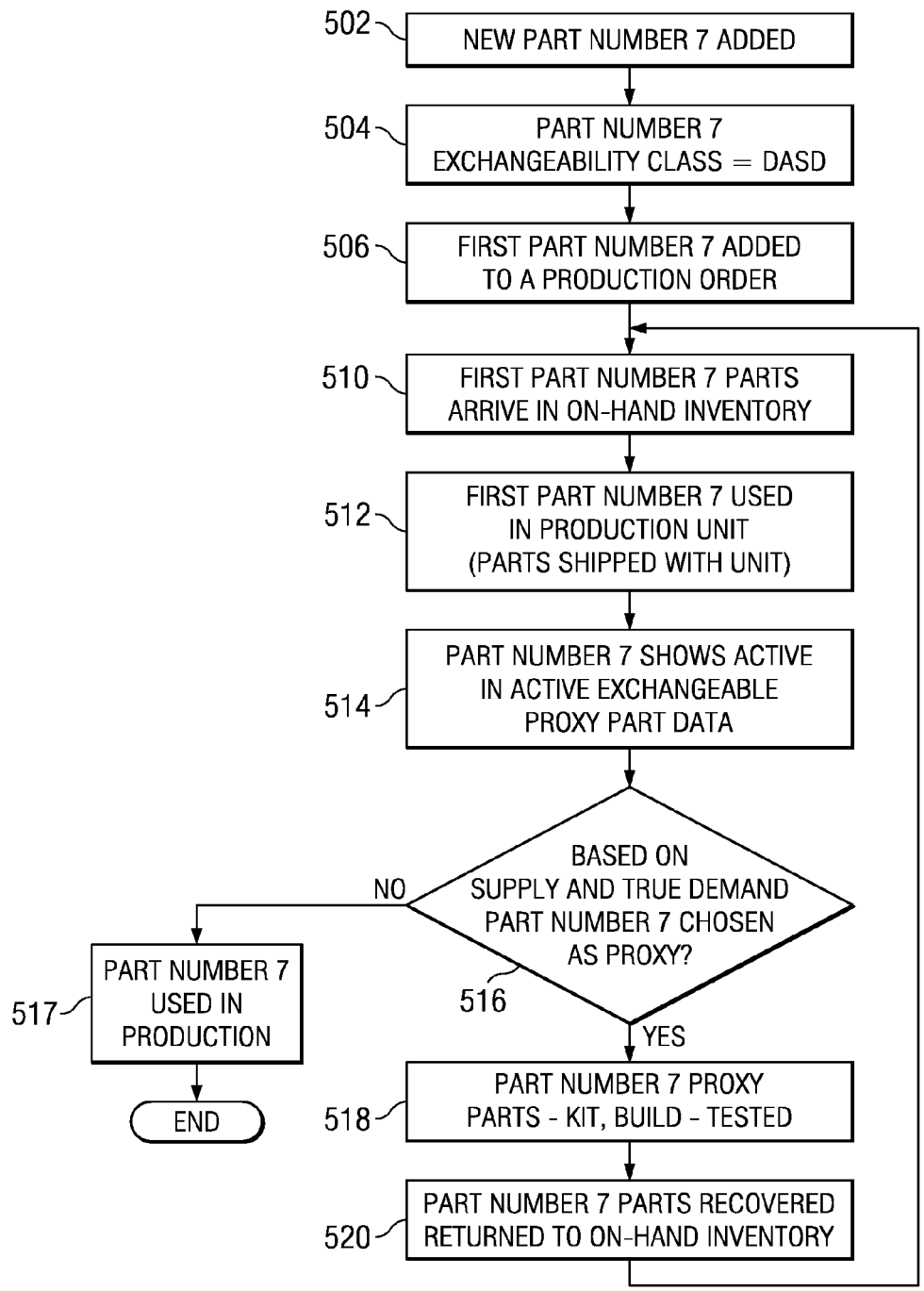
FIG. 5 is a flow chart of the activities of a part number utilizing exchangeable classification attributes, in accordance with the illustrative embodiments.

Next, FIG. 5 is a flow chart of the activities of a part number utilizing exchangeable classification attributes, in accordance with the illustrative embodiments. A new part number 7 enters the improved manufacturing system (step 502). Engineering determines that part number 7 is exchangeable, and assigns an exchangeable classification of DASD, to the new part number (step 504). A configurator uses part number 7 as a production part in a production order bill of materials (step 506). A configurator is a person or system that determines the use of proxy parts. Therefore, true demand is created for part number 7. The parts arrive and are stored in on-hand inventory (step 510). Since part number 7 has not been used in a production unit, the part number is not available, as an active proxy part deemed exchangeable. Not yet appearing on the active exchangeable proxy part list, part number 7 may only be used as a production part. The part is incorporated and shipped in a production unit (step 512). The part number then appears in the active exchangeable proxy parts list in the first updating cycle following the production usage (step 514).

Next, the system determines if part number 7 is the best proxy part for a unit (step 516), based on on-hand inventory numbers, and true demand numbers for part number 7 and its alternate part numbers. If part number 7 is not selected as a proxy part, the part may be used as a production part and thus leave the system (step 517). If part number 7 is selected as a proxy part, the number 7 parts are kitted, built, and tested (step 518). Following test, the proxy parts are returned to on-hand inventory (step 520). The parts are now available as either production parts or proxy parts.

Figure 6:
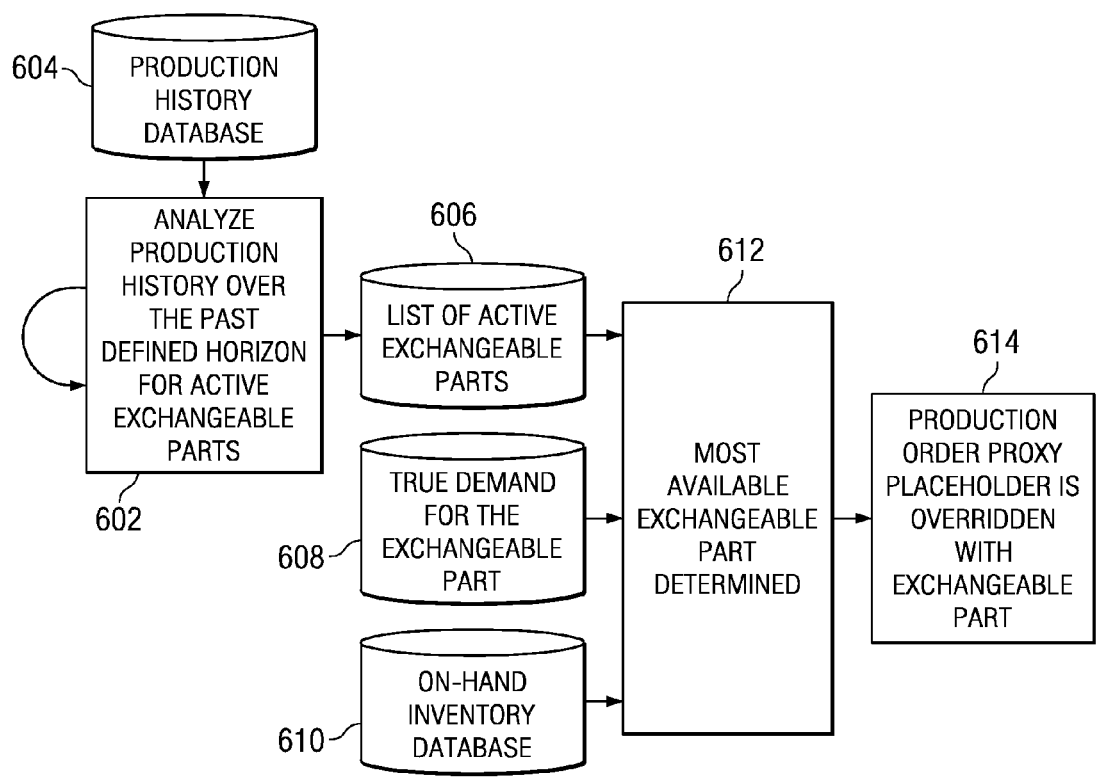
FIG. 6 is a flow chart depicting how the improved manufacturing system may calculate the best candidate part number to use as a proxy part, in accordance with the illustrative embodiments.

FIG. 6 is a flow chart depicting how the improved manufacturing system may calculate the best candidate part number to use as a proxy part, in accordance with the illustrative embodiments. The production history over the past-defined horizon for potential exchangeable candidates is analyzed (step 602). Using the production history database 604 over a configurable time frame for active exchangeable candidates, a list of "active" exchangeable proxy parts is compiled (step 606). The data is drawn from the production history database as in element 310 in FIG. 3. The production history database contains all of the production history of part numbers of the units that have been shipped within the specified time frame. Part numbers incorporated into recently shipped units are identified as currently active proxy parts that may be considered exchangeable candidates. The advantage to checking for active parts is that the proxy parts do not come from stale inventory.

The list of active exchangeable proxy parts may be updated frequently in self-adjusting cycles. Part numbers, which have not been used in production for a specified period, may be dropped from the list of proxy part numbers deemed exchangeable.

Next, the exchangeable part method looks at the true demand of the proxy part 608 and on-hand inventory database 610. The data is drawn from the production history database as in elements 312 and 308 in FIG. 3. The exchangeable part method also considers the proxy part number's alternate part numbers in the calculation, as illustrated in FIG. 4. In combining alternate part on-hand numbers and true demand numbers, a difference between supply and demand for each category of alternate parts is determined (step 612). The part with the greatest positive difference is the most available candidate to use as a proxy.

After the most available part is chosen as the proxy, the newly assigned proxy part number overrides the proxy part number called out in the original production bill of material (step 614). The override is accomplished in a step before the production order is released to manufacturing, in accordance with the illustrative embodiments. Manufacturing personnel then kits, builds, and tests the unit with the newly assigned proxy part. After testing, manufacturing removes the proxy part from the unit and returns the proxy part to on-hand inventory. This part may then be chosen again as a proxy part in another unit, or may be used and shipped as a production part.

The illustrative embodiments provide an improved manufacturing system by calculating a best-fit proxy part that maximizes use of available inventory for shipping production orders. An exchangeable application, method, or process is executed to manage a proxy part in its implementation in a proxy part flow. However, once removed from the unit after test, the proxy part may be put back in production inventory and reused later as either a proxy part or a production part. The improved manufacturing system has practical advantages. First, the exchangeable classified parts may be eventually sold. Second, as these proxy parts classified as exchangeable are maintained in the production inventory system, there is no separate inventory system, thereby reducing the likelihood of having an inventory of stale parts. Stale parts are parts that are no longer used in production units. The manufacturing system automatically identifies the most appropriate part to use, based on the initial set up of the part, the quantity of parts in stock, and the demand for the part. The system will shorten manufacturing cycle times, especially in peak demand periods. It will reduce the risk of miss-shipment due to constraint of proxy parts. It will maximize available inventory by using the concept of production inventory exchangeability for proxy parts. Moreover, the exchangeable part method may minimize capital expenditures typically used to support required proxy parts.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system for managing proxy parts comprising:
   analyzing by a processing unit coupled to the data processing system a production history stored in a storage device to identify a list of active exchangeable proxy parts within an on-hand inventory at a manufacturer that are used to make production units functional for testing during manufacture but are not included with shipped production orders, wherein the on-hand inventory supply and true demand numbers are calculated by combining alternate part numbers;
   selecting a most available active exchangeable proxy part from the list of active exchangeable proxy parts within the on-hand inventory as a proxy part for a production unit, wherein the most available active exchangeable proxy part is selected from the list of active exchangeable proxy parts within the on-hand inventory based on a greatest positive difference produced between an on-hand inventory supply of the active exchangeable proxy parts in the list and a true demand for the active exchangeable proxy parts in the list;
   overriding a production order proxy part in an original production bill of materials for the production unit with the selected most available active exchangeable proxy part;
   recovering the selected most available active exchangeable proxy part from the production unit after the testing and prior to shipment of the production unit; and
   returning the selected most available active exchangeable proxy part recovered from the production unit to the on-hand inventory.

2. The computer implemented method of claim 1, further comprising:
   creating and maintaining a table of parts deemed exchangeable via part classification.

3. The computer implemented method of claim 1, further comprising:
   assigning an exchangeability classification to each list of exchangeable proxy parts.

4. The computer implemented method of claim 1, further comprising:
   determining that a proxy part is an active exchangeable classified part by a production activity level for the proxy part.

5. The computer implemented method of claim 4, wherein the production activity level includes both a ship level and a production usage level of the proxy part.

6. The computer implemented method of claim 1, wherein a basis for selecting the most available active exchangeable part as a proxy part is calculated by subtracting a number of a total alternative part true demand from a number of a total alternative part on-hand inventory.

7. The computer implemented method of claim 1, further comprising:
using a projected recovered proxy inventory in calculating the on-hand inventory of an active proxy part.

8. A computer program product stored on a computer usable storage medium having computer usable program code embodied thereon for managing proxy parts, the computer program product comprising:
   computer usable program code for analyzing a production history to identify a list of active exchangeable proxy parts within an on-hand inventory at a manufacturer that are used to make production units functional for testing during manufacture but are not included with shipped production orders, wherein the on-hand inventory supply and true demand numbers are calculated by combining alternate part numbers;
   computer usable program code for selecting a most available active exchangeable proxy part from the list of active exchangeable proxy parts within the on-hand inventory as a proxy part for a production unit, wherein the most available active exchangeable proxy part is selected from the list of active exchangeable proxy parts within the on-hand inventory based on a greatest positive difference produced between an on-hand inventory supply of the active exchangeable proxy parts in the list and a true demand for the active exchangeable proxy parts in the list;
   computer usable program code for overriding a production order proxy part in an original production bill of materials for the production unit with the selected most available active exchangeable proxy part;
   computer usable program code for recovering the selected most available active exchangeable proxy part from the production unit after the testing and prior to shipment of the production unit; and
   computer usable program code for returning the selected most available active exchangeable proxy part recovered from the production unit to the on-hand inventory.

9. The computer program product of claim 8, further comprising:
   computer usable program code for creating and maintaining a table of exchangeable classified parts.

10. The computer program product of claim 8, further comprising:
    computer usable program code for assigning an exchangeability classification to each list of proxy parts.

11. The computer program product of claim 8, further comprising:
    computer usable program code for determining that an exchangeable proxy part is an active exchangeable proxy part by a production activity level for the exchangeable proxy part.

12. The computer program product of claim 8, wherein a production activity level includes both a ship level and a production usage level of the proxy part.

13. The computer program product of claim 8, further comprising:
    computer usable code for using a projected recovered proxy inventory in calculating the on-hand inventory of an active exchangeable proxy part.

14. A data processing system comprising:
    a bus system;
    a communications system connected to the bus system;
    a memory connected to the bus system, wherein the memory includes a set of instructions; and
    a processing unit connected to the bus system, wherein the processing unit executes the set of instructions to analyze a production history to identify a list of active exchangeable proxy parts within an on-hand inventory at a manufacturer that are used to make production units functional for testing during manufacture but are not included with shipped production orders, wherein the on-hand inventory supply and true demand numbers are calculated by combining alternate part numbers; select a most available active exchangeable proxy part from the list of active exchangeable proxy parts within the on-hand inventory as a proxy part for the production unit, wherein the most available active exchangeable proxy part is selected from the list of active exchangeable proxy parts within the on-hand inventory based on a greatest positive difference produced between an on-hand inventory supply of the active exchangeable proxy parts in the list and a true demand for the active exchangeable proxy parts in the list; override a production order proxy part in an original production bill of materials for the production unit with the selected most available active exchangeable proxy part; recover the selected most available active exchangeable proxy part from the production unit after the testing and prior to shipment of the production unit; and return the selected most available active exchangeable proxy part recovered from the production unit to the on-hand inventory.

15. The data processing system of claim 14, wherein the processing unit executes a further set of instructions to determine that an exchangeable proxy part is an active exchangeable proxy part by a production activity level for the exchangeable proxy part.

\* \* \* \* \*